United States Patent Office 3,193,374
Patented July 6, 1965

3,193,374
COMPLEX FERTILIZERS
Philippe Jean-Baptiste Gautier, Naterre, Seine, and Marguerite Provoost, Paris, France, assignors to Compagnie de Saint-Gobain, Neuilly-sur-Seine, France
No Drawing. Filed Apr. 25, 1961, Ser. No. 105,300
Claims priority, application France, Apr. 27, 1960, 825,469
6 Claims. (Cl. 71—41)

This invention relates to complex fertilizers having a base of potassium tripolyphosphate and containing the three fertilizing elements, nitrogen, potassium and phosphorous, and to a process of making them.

It is known that one may produce from compositions of phosphoric acid complete fertilizers containing these three elements, but that such fertilizers have heretofore scarcely exceeded 60% of them.

It is also known that potassium tripolyphosphate constitutes a fertilizer having a high content of $K_2O$ and $P_2O_5$ and that of the total 100% of fertilizing elements 52.5% is $K_2O$ and 47.5% is $P_2O_5$, when the fertilizer is prepared from pure phosphoric acid, and that this fertilizer is substantially totally soluble in natural water. At the same time the use of such fertilizer is difficult, if not impossible, because of its great hygroscopicity which causes it to lump together during storage.

It is an object of this invention to make new fertilizers containing the three elements N, P and K which contain at least 75% of fertilizing elements and being highly soluble in water while at the same time lacking hygroscopicity. These new products have been made by the process hereinafter described.

The objects of the invention are accomplished, generally speaking, by a method of making fertilizers which comprises moistening potassium tripolyphosphate with aqueous phosphoric acid and granulating the mixture in an atmosphere comprising ammonia.

In the preferred form of the invention the potassium tripolyphosphate used in the preparation of the fertilizer should be made from phosphoric acid which has itself been made by the wet way, and which may advantageously contain trace elements as impurities such as magnesium, copper and manganese which are beneficial to the soil in small amounts. The potassium tripolyphosphate is advantageously prepared by adding to phosphoric acid some potassium carbonate or, preferably, potassium hydroxide in concentrated solution, the proportions being such as to establish the ratio of potassium to phosphorous of 5 to 3. The fixing of this ratio may advantageously be precise and can be established by the use of a pH meter, the solution of potassium hydroxide being added to the phosphoric acid until the pH reaches 6.8 at which level the addition ceases. The solution thus prepared is dried, the product obtained by drying is put in a furnace at 200° C. for ½ hour, and thereafter the temperature is raised to 400° C. for 1 hour to produce the condensation to tripolyphosphate. The tripolyphosphate drawn from the furnace contains much higher, insoluble polyphosphates detectable by chromatographic analysis and has the following approximate composition:

| | Percent |
|---|---|
| $P_2O_5$, total | 46.2 |
| Water soluble $P_2O_5$ | 44.5 |
| Water soluble $K_2O$ | 47.2 |

This potassium tripolyphosphate is hygroscopic and contains 93.4% of fertilizing elements of which 91.7% are soluble in water.

In preparing the new product the potassium tripolyphosphate above described is moistened with phosphoric acid of medium concentration, for instance containing about 30% $P_2O_5$, and is granulated by the methods which are customarily used for granulation in an atmosphere of ammonia. The ammoniation is carried on until the formation of diammonium phosphate begins, at which time the ammoniation is terminated and a phosphate having the following composition is obtained:

| | Percent |
|---|---|
| Total $P_2O_5$ | 42.6 |
| Water soluble $P_2O_5$ | 41.9 |
| Water soluble $K_2O$ | 33 |
| Ammoniacal nitrogen | 2.9 | constituting a total of 78.5% of fertilizing elements of which 77.8% are soluble in water. Consequently this fertilizer contains the three fertilizing elements in very high percentage.

If it is desired to still further increase the content of nitrogen one may add to this fertilizer a fertilizer having high nitrogen content such as urea or diammonium phosphate. The operation is carried out as described above, that is to say potassium triopolyphosphate is mixed with the selected nitrogenous fertilizer, the mixture is moistened with phosphoric acid and the granulator is supplied with a slow current of ammonia. There is thus produced a complex fertilizer which is not hygroscopic and which contains 83% to 88% of fertilizing elements of which a very high proportion is soluble in water.

The following examples also illustrate the invention.

*Example A*

To 52 parts of potassium tripolyphosphate by weight containing 52.5% $K_2O$ and 47.5% $P_2O_5$ there are added 43 parts diammonium phosphate having a ratio of N to P about 1.5. The mixture is moistened with 10 parts of phosphoric acid containing 30% $P_2O_5$ by weight and granulation is carried out in the usual apparatus and under the usual conditions in the presence of an atmosphere containing a substantial propotrion of ammonia. 1.7 parts by weight of nitrogen were fixed as $NH_3$ (2.07 parts $NH_3$) in the ammoniation step. The fertilizer thus obtained has the composition:

| | Percent |
|---|---|
| Total $P_2O_5$ | 51.2 |
| Water soluble $P_2O_5$ | 50.7 |
| Assimilable $P_2O_5$ | 51 |
| Water soluble $K_2O$ | 27 |
| Ammoniacal nitrogen | 8.8 |

This adds up to a total of 87% of fertilizing elements of which 86.5% are water soluble. The fertilizer was granular, and contained 8.8% of ammoniacal nitrogen, 51.2% anhydrous $P_2O_5$, and 27% anhydrous $K_2O$.

*Example B*

Mix 76 parts of potassium tripolyphosphate containing 52.5% $K_2O$ and 47.5% $P_2O_5$, and 20 parts of urea, in place of ammonium phosphate, then proceed as in Example A using 21.5 parts of phosphoric acid containing 30% $P_2O_5$. 1.2 parts of ammonia were fixed from an ammonia atmosphere in the granulator. The fertilizer obtained contains:

| | Percent |
|---|---|
| Total $P_2O_5$ | 38.2 |
| Water soluble $P_2O_5$ | 37.4 |
| Assimilable $P_2O_5$ | 37.8 |
| Water soluble $K_2O$ | 36 |
| Total nitrogen | 9.4 |

This adds up to 83.6% of fertilizing elements of which 82.8% are water soluble.

Field tests have been made following the methods of Neubauer and the new products have been tested for absorption by barley plants. In comparison to barley plants treated by the classical fertilizers, calcium nitrate, superphosphate, and potassium chloride, the new fertilizers showed excellent assimilability of the $P_2O_5$ and the $K_2O$ provided by the potassium tripolyphosphate, the assimilability of phosphorous and potassium being the same for the new products as for the fertilizers of superphosphate and potassium chloride, when used in equal quantities and standard doses. The new fertilizers may be used in all Spring and Fall plantings either by incorporation in the soil, by pulverization with mulch or in water of irrigation.

These products are much superior to those prior art fertilizers made from phosphoric acid which were complete in N, P and K, particularly in that they contain a much higher content of the three elements, being on the order of 75% or more as compared to the approximate maximum of 60% attained by the prior art product.

As many apparently widely different embodiments of the present invention may be made without departing from the spirit and scope thereof, it is to be understood that the invention is not limited to the specific embodiments.

What is claimed is:

1. The method of producing complex fertilizer having a base of potassium tripolyphosphate and containing substantial amounts of K, P, and N which comprises adding to a mass comprising potassium tripolyphosphate having substantial proportions of water soluble $P_2O_5$ and water soluble $K_2O$, a quantity of aqueous wet process phosphoric acid containing about 30% $P_2O_5$ in quantity sufficient to moisten said mass, and granulating the moistened mass in an atmosphere of ammonia until the formation of diammonium phosphate begins.

2. The method of producing complex fertilizer having a base of potassium tripolyphosphate and containing substantial amounts of K, P, and N which comprises adding to a mass of potassium tripolyphosphate an aqueous solution of wet process phosphoric acid containing about 30% $P_2O_5$ and in quantity sufficient only to moisten the mass, and granulating the moistened mass in an atmosphere of ammonia until the formation of diammonium phosphate begins, whereby to produce a fertilizer consisting essentially of water soluble $P_2O_5$ about 41.9%, water soluble $K_2O$ about 33%, and ammoniacal nitrogen about 2.9%.

3. The method of producing complex fertilizer having a base of potassium tripolyphosphate and containing substantial amounts of K, P, and N which comprises adding to a mass of potassium tripolyphosphate, an aqueous solution of wet process phosphoric acid of medium strength in $P_2O_5$ and in quantity sufficient only to moisten said mass, and granulating the moistened mass in an atmosphere of ammonia only until the formation of diammonium phosphate begins and the product after drying tests about 8–9% total N.

4. The method of producing a high-nitrogen-content fertilizer, comprising, adding to a mass consisting by weight of about 55% potassium tripolyphosphate and 45% diammonium phosphate, a quantity of phosphoric acid containing about 30% $P_2O_5$, sufficient to moisten said mass, and granulating the moistened mass in an atmosphere of ammonia, to produce a fertilizer having a content of water solube $P_2O_5$ about 50.7%, water soluble $K_2O$ about 27%, and ammoniacal nitrogen about 8.8%.

5. The method of producing a high-nitrogen-content fertilizer, comprising, adding to a mass consisting by weight of about 80% potassium tripolyphosphate and 20% urea, an aqueous solution of phosphoric acid containing about 30% $P_2O_5$ in quantity sufficient to moisten said mass, and granulating the moistened mass in an atmosphere of ammonia, to produce a fertilizer having a content of water soluble $P_2O_5$ about 37.4%, water soluble $K_2O$ about 36%, and ammoniacal nitrogen about 9.4%.

6. The method of producing fertilizer consisting of mixing with a mass of potassium tripolyphosphate a substance selected from the group consisting of diammonium phosphate and urea, in proportions by weight of from 55 to 80% potassium tripolyphosphate, and the balance the said substance, moistening the mixture with aqueous phosphoric acid containing about 30% $P_2O_5$, and granulating the moistened mixture in an atmosphere of ammonia to produce a fertilizer having the content of water soluble $P_2O_5$ about 37.4% to 50.7%, water soluble $K_2O$ about 27% to 36%, and assimilable nitrogen about 8.8% to 9.4%.

References Cited by the Examiner

UNITED STATES PATENTS

| 1,103,910 | 7/14 | Wilson et al. | 71—51 |
|---|---|---|---|
| 1,146,222 | 7/15 | Wilson et al. | 71—51 |
| 2,383,502 | 8/45 | Quimby | 23—106 |
| 2,731,420 | 1/56 | Sylvester | 23—106 |
| 2,948,588 | 8/60 | Baumann | 23—106 |
| 2,977,213 | 3/61 | Maluta et al. | 71—41 |
| 2,988,439 | 6/61 | Gloss | 23—106 |
| 3,053,622 | 9/62 | Bostwick | 71—41 |

OTHER REFERENCES

Chemistry and Technology of Fertilizers, Sauchelli, Reinhold Publishing Corp., 1960, Monograph Series No. 148, pages 269–280, specifically relied on pages 272, 273.

DONALL H. SYLVESTER, *Primary Examiner.*

MAURICE A. BRINDISI, GEORGE D. MITCHELL, ANTHONY SCIAMANNA, A. LOUIS MONACELL, *Examiners.*